United States Patent [19]

Maniaci

[11] 4,067,654

[45] Jan. 10, 1978

[54] APPARATUS FOR VARIABLY POSITIONING AND SECURING CAR RADIOS AND THE LIKE

[75] Inventor: Robert P. Maniaci, Downey, Calif.

[73] Assignee: Boman Industries, Downey, Calif.

[21] Appl. No.: 625,706

[22] Filed: Oct. 24, 1975

[51] Int. Cl.² .............................................. F16B 43/00
[52] U.S. Cl. ....................................... 403/4; 403/259; 325/352; 312/7 R
[58] Field of Search .................. 403/256, 259, 261, 3, 403/4, 247; 248/27 R; 312/245, 7 R; 325/352

[56] References Cited

U.S. PATENT DOCUMENTS

| | | | |
|---|---|---|---|
| 2,412,259 | 12/1946 | Graves, Jr. ............................. | 403/256 |
| 3,390,338 | 6/1968 | Race ................................. | 312/7 R X |
| 3,685,879 | 8/1972 | Tsuji ................................. | 248/27 R |
| 3,906,371 | 9/1975 | Tsuji ................................. | 325/352 |
| 3,922,047 | 11/1975 | Tsuji ................................. | 312/7 R |

Primary Examiner—Andrew V. Kundrat
Attorney, Agent, or Firm—Romney, Schaap, Golant, Scillieri, Disner & Ashen

[57] ABSTRACT

Apparatus for variably positioning and securing car radio units and the like, including a mounting shaft securable on a front chassis plate in a number of different positions spaced horizontally, vertically and diagonally from each other. A bracket member has an opening to receive the shaft and a plurality of legs extend therefrom for insertion into different sets of alignment holes on the front chassis plate.

5 Claims, 3 Drawing Figures

APPARATUS FOR VARIABLY POSITIONING AND SECURING CAR RADIOS AND THE LIKE

BACKGROUND OF THE INVENTION

1. Field of the Invention

The present invention relates to variable positioning and securing mounting shafts and, more particularly, to an apparatus for variably securing and positioning mounting shafts of a car radio, stereo, television, or the like so that the same chassis frame may be mounted on differently sized frames or enclosures having diversely spaced openings for receiving the mounting shafts.

2. Description of the Prior Art

It has been the desire of the automobile accessory industry to make and carry in inventory a standard car radio or stereo chassis unit which can be used in a variety of car makes and models in order to decrease cost. Because car manufacturers do not produce cars with dashboards having uniformly spaced mounting openings, it has become necessary to provide movable mounting shafts which carry the control knobs so that their position may be changed to accommodate different dashboard structures.

In the past, this positioning problem has been resolved primarily by single direction variations of the relative positions of the shafts. A typical prior device included an alignment bracket for matching engagement with different pairs of horizontally aligned holes on the chassis plate. Thus, it was not possible to vary the horizontal and vertical position of the control mechanism simultaneously relative to the chassis.

Since many car radios are installed by the car owner, the devices employed had to be simple enough to be used by the average person.

Some of the prior devices also did not sufficiently prevent undesired rotation of the control knob wires if the mounting shaft became loose. Many times this rotation caused wires which were attached to the mechanism to be broken whereby the radio or television was rendered inoperative.

Similar goals and problems are present when dealing with television chassis and the like where it is desired to produce a single chassis frame installable in a variety of cabinets.

SUMMARY AND OBJECTS OF THE INVENTION

The above mentioned problems of the prior art have been overcome by the present invention which provides apparatus for variable positioning and securing of the mounting shafts carrying the tuning and/or volume control knobs and the like of a radio, stereo, or the like.

The general object of the invention is to provide an apparatus for variably positioning and securing a control mechanism of a radio or other device which is simply constructed, economical to produce, and capable of being used by the average person.

Another object of the present invention is to provide a positioning apparatus which is sturdy, reliable and easy to use.

Still another aspect of the invention is to provide an apparatus for variably positioning and securing the control mechanism of a radio which is capable of permitting simultaneous variations in the horizontal and vertical locations of the control mechanisms of radios, television and the like.

Yet another object of the invention is to provide an apparatus for variably positioning and securing a control mechanism of a radio and the like which will prevent the control mechanism from rotating about its longitudinal axis during use even if the device becomes loosened.

Other objects and advantages of the invention will appear from the following description taken in conjunction with the accompanying drawings.

DESCRIPTION OF THE PREFERRED EMBODIMENTS

Figure 1:
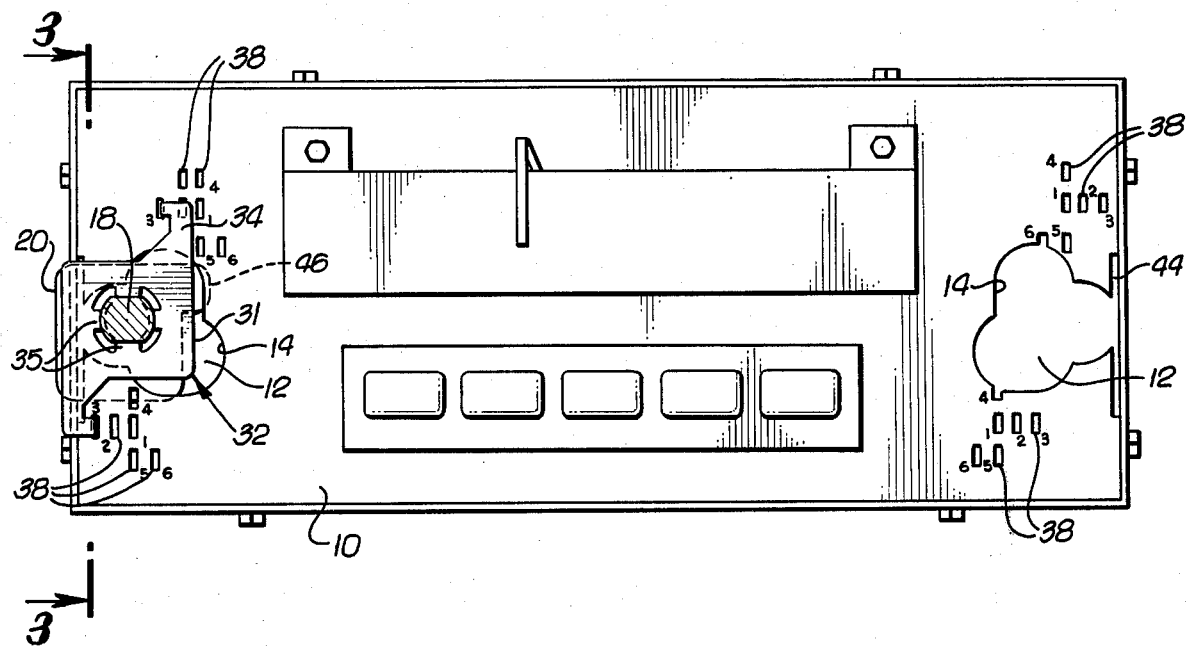
FIG. 1 is a frontal view of the apparatus interconnected with an automobile radio.
Figure 2:
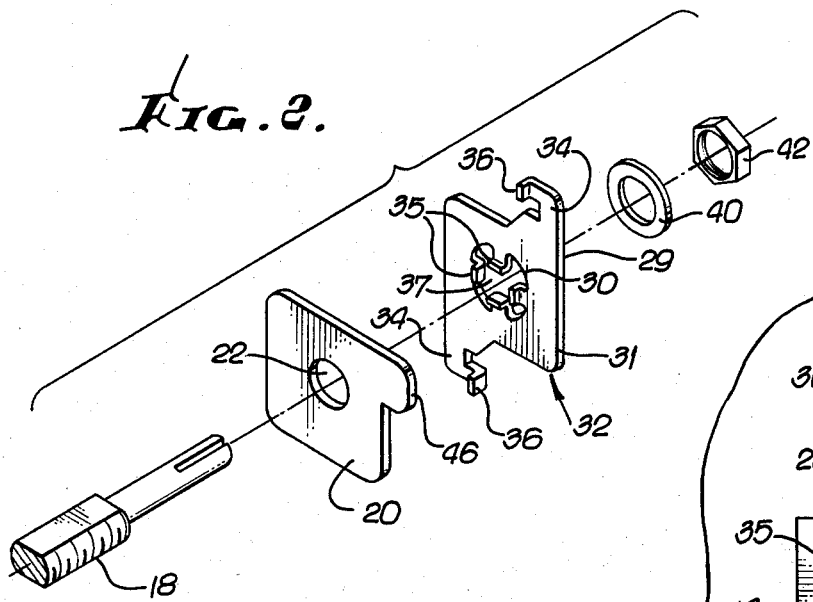
FIG. 2 is a perspective view of the alignment member.
Figure 3:
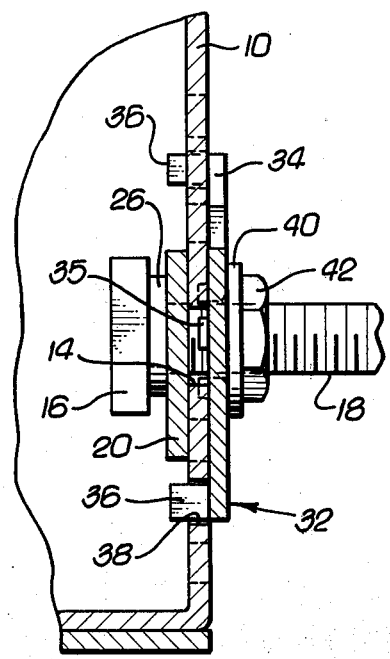
FIG. 3 is a cross-sectional view of the apparatus taken along line 3—3 of FIG. 1.

While the present invention is susceptible to various modifications and alternative constructions, an illustrative embodiment is shown in the drawings and will be described in detail hereinbelow. It should be understood, however, that it is not the intention to limit the invention to the particular form disclosed; but, on the contrary, the invention is to cover all modifications, equivalences and alternative constructions falling within the spirit and scope of the invention as expressed in the appended claims.

In the drawing as illustrated a chassis 10 has an enlarged shaft outlet 12 formed by the edge 14.

The exemplary shaft is shown as a projecting threaded finger 18 of the control mechanism 16 which passes through a hole 22 of a backing plate 20 adjacent a collar 26 on the control mechanism 16. The forward end of the projecting finger is encircled by an inner edge 30 of an alignment bracket member 32.

The threaded finger 18 is slightly rectangular in lateral cross section as is the hole 22 in the backing plate 20. Thus, relative circular movement between the projecting finger 18 of the control mechanism 16 and the backing plate 20 is prevented. The outlet 12 is sufficiently small to prevent the passage of the backing plate 20, yet large enough to allow horizontal, vertical and/or diagonal movement of the control mechanism shaft to a desired location.

There is an cut-out 44 on the side, and extending around to the front, of the chassis to accommodate the backing plate 20 when the control mechanism is in a horizontally extended position so that the edge of the plate extends beyond the chassis 10. The backing plate 20 has a rectangular extension 46 abutting the rearward portion of a chassis 10 in the vicinity of the edge 14 of the hole 12 so that the plate 20 will remain on the inner side of the chassis 10 while the control mechanism is in such extended position.

An alignment bracket member 32 is provided having a substantially rectangular body portion 31 and non-aligned leg portions 34 extending from the body portion 31 on the right and left sides thereof and in opposite vertical directions.

At the end of each leg portion 34 there is a rearwardly projecting rectangular tooth 36. The body portion 31 of the alignment member 32 has a centrally located aperture 37 sufficiently large to accommodate the projecting threaded finger 18 of the control mechanism 16. The body portion 31 has a plurality of bumpers 35 extending inwardly and rearwardly from the inner edge 30 of the alignment member. The surfaces of the bumpers 35 which are perpendicular to the forward surface 29 of the alignment member may be machined to a smooth curved or flat surface, to correspond to the shape of the portion of the projecting threaded finger of the control mechanism in contact with the surface, and are positioned in rectangular alignment to prevent relative circular movement between the alignment member and the control mechanism when the projecting threaded finger is inserted in the opening of the alignment member. The machined inner surface of the bumpers protect the threads of the finger from being damaged during insertion and removal.

Alignment slots or holes 38 in the chassis 10 are preferably formed into two groups, one above and slightly to the right of the opening 12 and the other below and slightly to the left of the opening 12. The pattern formed by each group is identical and comprises a plurality of rows and columns of the alignment.

Each group of alignment holes is arranged so that every alignment hole in one group has a complimentary alignment hole in the other group. The two alignment holes are spaced apart and have the same relative position to each other as do the teeth 36 of the alignment member 32. Thus the position of the alignment member can be inverted and has no top or bottom.

The projecting threaded finger 18 of the control mechanism 16 is then inserted into the opening 37 of the alignment member 32 so that the teeth 36 point toward the chassis 10. The teeth 36 are then inserted into a pair of alignment holes 38.

A washer 40 is inserted over the projecting finger 18 so as to abut the alignment member 32 and a threaded nut 42 is rotated on the projecting finger so as to abut the washer 40.

Each of the pairs of alignment holes 38 in the chassis 10 are located so that the position of the control mechanism 16 is in the desired location when the teeth 36 of the alignment member 32 are inserted into said alignment holes.

The apparatus is assembled so that the plate 20 abuts the collar 26 of the control mechanism 16 on one side and the inner side of the chassis 10 on the other. The alignment member 32 is then inserted on the projecting threaded finger 18 and located in the desired position. The teeth 36 are then inserted into the alignment holes 38. A washer 40, a nut 42 are inserted upon the projecting finger 18 and the nut 42 is tightened.

As mentioned previously due to the fact that the projecting finger 18 and the inner edge of the opening 37 of the alignment member 32 are both rectangular, relative circular movement between the two elements will be eliminated even when the nut 42 is slightly loose.

If it is desired to realign the control mechanism 16, the nut 42 is sufficiently loosened so as to allow the teeth 36 to be removed from the alignment holes 38. The teeth 36 are then repositioned into the desired new alignment holes and the nut 42 tightened.

It will be noted that in order to best accomplish the foregoing operations, the peripheral pattern of the rows and columns of the alignment holes or slots correspondends generally to the peripheral pattern of the outlet 12.

I claim as my invention:

1. An apparatus for variably positioning and securing an object having a first portion and a finger portion projecting therefrom comprising:

a frame having an inward and outward surface, a control opening into which the finger portion is inserted so that the first portion is on the inward side of the frame, and a plurality of alignment holes arranged into a plurality of groups, the holes of each group forming a pattern identical to every other group;

a plate having a centrally located opening into which the finger portion is inserted so that the plate abuts the first portion and the inward side of the frame;

an alignment member abutting the outward side of the frame, having an opening for receiving the finger portion and a plurality of leg portions, each leg portion having a tooth, the same distance from the center of the opening, projecting inwardy for engaging an alignment hole, each tooth equidistant from the center of the opening in the alignment member and having a complementary tooth lying on a straight line defined by the first tooth and the center of the opening; and wherein all teeth are equidistant from the center of the opening in the alignment member compression means for forcing the plate and alignment member against the frame and the first portion against the plate.

2. An apparatus for variably positioning and securing an object having a first portion and a finger portion projecting therefrom comprising:

a frame having an inward and outward surface, a control opening into which the finger portion is inserted so that the first portion is on the inward side of the frame, and a plurality of alignment holes;

a plate having a centrally located opening into which the finger portion is inserted so that the plate abuts the first portion and the inward side of the frame;

an alignment member abutting the outward side of the frame, having an opening for receiving the finger portion, a plurality of bumper members projecting inwardly along the edge of the opening in the alignment member for protection of the finger portion as the alignment member is engaged and disengaged with the finger portion, and a plurality of leg portions, each leg portion having a tooth projecting inwardly for engaging an alignment hole; and compression means for forcing the plate and alignment member against the frame and the first portion against the plate.

3. An apparatus for variably positioning and securing an object having a first portion and a finger portion projecting therefrom comprising:

a frame having an inward and outward surface, a control opening into which the finger portion is inserted so that the first portion is on the inward side of the frame, and a plurality of alignment holes;

a plate having a centrally located opening into which the finger portion is inserted so that the plate abuts the first portion and the inward side of the frame;

an alignment member abutting the outward side of the frame, having a noncircular opening for receiving the finger portion and a plurality of leg portions, each leg portion having a tooth projecting inwardly for engaging an alignment hole; and compression means for forcing the plate and alignment member against the frame and the first portion against the plate.

4. An apparatus for variably positioning and securing an object having a first portion and a finger portion porjecting therefrom comprising:
- a frame having an inward and outward surface, a control opening into which the finger portion is inserted so that the first portion is on the inward side of the frame, and a plurality of alignment holes arranged into a plurality of groups, the holes of each group forming a pattern identical to every other group, and each group, comprising a plurality of rows and columns;
- a plate having a centrally located opening into which the finger portion is inserted so that the plate abuts the first portion and the inward side of the frame;
- an alignment member abutting the outward side of the frame, having an opening for receiving the finger portion and a plurality of leg portions, each leg portion having a tooth projecting inwardly for engaging an alignment hole; and
- compression means for forcing the plate and alignment member against the frame and the first portion against the plate.

5. An apparatus for variably positioning and securing an object having a first portion and a finger portion projecting therefrom comprising:
- a frame having an inward and outward surface, a control opening into which the finger portion is inserted so that the first portion is on the inward side of the frame, and a plurality of alignment holes;
- a plate having a centrally located opening into which the finger portion is inserted so that the plate abuts the first portion and the inward side of the frame;
- an alignment member abutting the outward side of the frame, having an opening for receiving the finger portion and a plurality of parallel leg portions equidistant from the center of the opening in the alignment member, each leg portion having a tooth projecting inwardly for engaging an alignment hole; and
- compression means for forcing the plate and alignment member against the frame and the first portion against the plate.

* * * * *